UNITED STATES PATENT OFFICE.

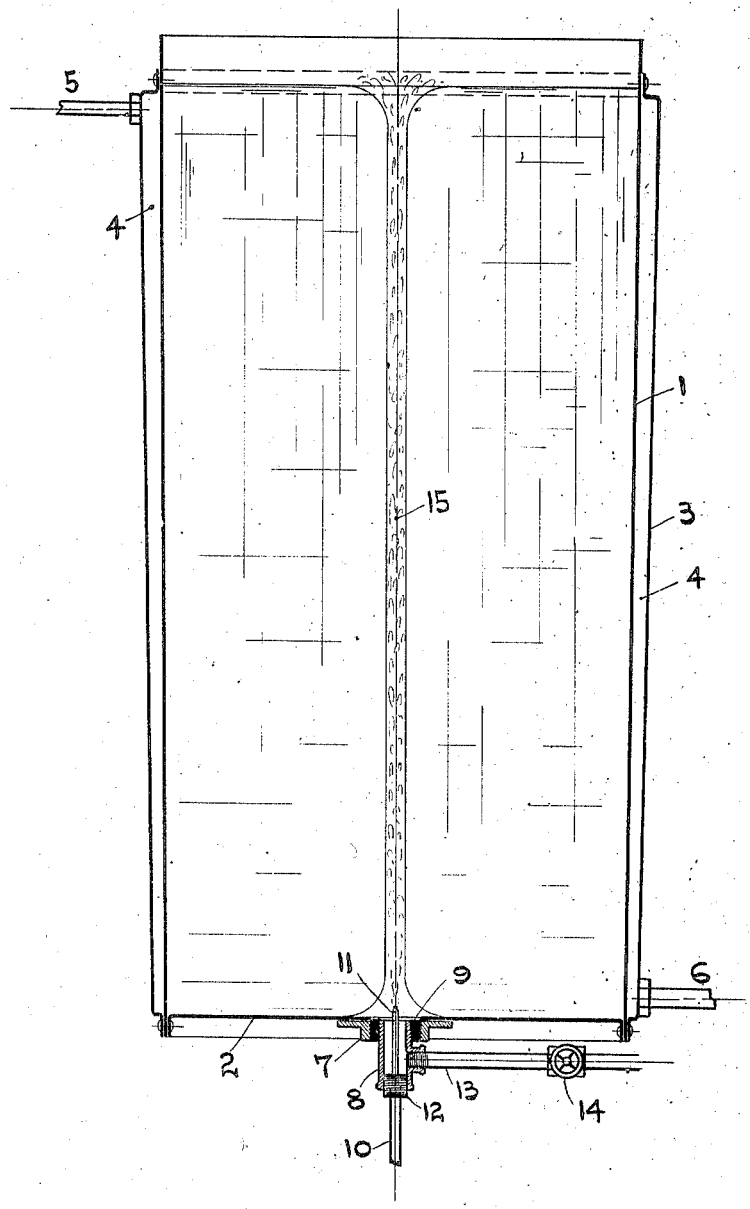

OMAR H. JEWELL, OF CHICAGO, ILLINOIS, ASSIGNOR TO POLAR ICE MACHINE COMPANY, OF CHICAGO, ILLINOIS, A CORPORATION OF ILLINOIS.

APPARATUS FOR MAKING ARTIFICIAL ICE.

965,584.  Specification of Letters Patent.  Patented July 26, 1910.

Application filed April 26, 1909. Serial No. 492,369.

*To all whom it may concern:*

Be it known that I, OMAR H. JEWELL, a citizen of the United States, residing at Chicago, in the county of Cook and State of Illinois, have invented certain new and useful Improvements in Apparatus for Making Artificial Ice, of which the following is a specification, reference being had to the accompanying drawing.

My invention relates to the manufacture of artificial ice, and has for its object to provide certain improvements in apparatus for that purpose by which pure, clear ice may be made from raw water and at a lower cost than has heretofore been practicable. I accomplish this object as illustrated in the drawing and as hereinafter described.

What I regard as new is set forth in the claims.

In the accompanying drawing, in which the figure is a vertical sectional view of a simple form of my improved apparatus, 1 indicates a can or receptacle adapted to contain the water to be frozen. Said can may be made of any suitable material, such as galvanized iron, and is provided with a bottom 2, which is exposed to the air.

3 indicates a jacket, which surrounds the sides of the can, forming a brine chamber 4 extending from the bottom to the top of the can around the sides thereof, through which the brine, or other freezing medium, circulates.

5 indicates an inlet-pipe communicating with the upper portion of the brine-chamber 4 for admitting brine thereto.

6 indicates an outlet-pipe that communicates with the lower portion of the brine-chamber 4, preferably at the opposite side of the can from the inlet-pipe 5. The arrangement is such that the brine enters the chamber 4 at one side thereof near the top and passes out at the other side thereof near the bottom.

7 indicates a collar secured centrally to the bottom 2, and 8 indicates a sleeve which is fitted into the collar 7 centrally, being insulated therefrom by an insulating collar 9. Preferably the parts 7, 8 and 9 are screwed together for convenience in assembling them and taking them apart.

10 indicates an air-pipe, which extends into the sleeve 8 from below and is provided with a nozzle 11 directed upward along the center line of the cam so as to discharge air thereinto at the center in an upward direction. The air-pipe 10 is best secured to the sleeve 8 by a nipple 12 screwed into the lower end of the sleeve 8, as shown.

13 indicates a drain-pipe, which communicates with the sleeve 8 preferably at one side thereof, as shown in the drawing, said drain-pipe being provided with a valve 14, by the operation of which said drain-pipe may be opened or closed as desired.

The operation of the apparatus is as follows: The valve 14 being first closed, the can 1 is filled with the water to be frozen and brine, or other freezing medium, is caused to circulate through the chamber 4. At the same time air is admitted at the bottom of the can through the pipe 10. The ice begins to form at the sides of the can, growing toward the center thereof as freezing progresses. The forming ice, however, is kept pure by reason of the agitation of the water induced by the compressed air admitted to the pipe 10. This agitation of the water prevents the impurities from adhering to the ice or becoming embedded therein, so that as freezing progresses the unfrozen water gradually becomes more and more impure proportionately. Owing to the conductivity of the metal composing the bottom 2 of the can, the ice grows along the bottom as well as in the intermediate portions of the can, but this does not interfere with the admission of the air as the air-pipe is insulated from the bottom, as above described. It will be noted that the air-pipe is outside of the brine chamber and can, and is not exposed to the action of the freezing medium, so that the moisture contained in the air is not frozen and the air supply is not interfered with during the freezing operation. When freezing has advanced to the point shown in the drawing, so that only a small vertical passage 15 remains at the center of the mass of ice, the valve 14 is opened, allowing the impure water remaining in such passage to flow out through the drain-pipe 13, thereby leaving in the can a pure body of ice having a vertical passage at the center of it. If desired, after the impure water has been drawn off, the central passage may be flushed out with fresh water, but this is not usually necessary or desirable.

By the use of the apparatus herein described I am not only able to produce pure ice from raw water, but I am also able to greatly economize in the cost of making the ice in another important respect. I have demonstrated by experiment that the cost of freezing the water in the center of the block of ice is very much greater proportionately than that of freezing the remainder of the ice, this difference being indicated by the fact that the first 90% of the ice may be frozen in 70% of the time required to freeze the entire mass solid. Consequently, by stopping the freezing operation when 90% of the water in the can is frozen I am able to save 30% of the time which would be required if the operation were continued until all the water were frozen.

My invention is not limited in its application to cans adapted to contain a single block of ice, but may be applied also to receptacles of other forms. Furthermore, my invention is not limited to the specific features of the construction illustrated and described, except in so far as they are specifically claimed, as it includes generically the subject-matter of the broader claims.

What I claim as my invention and desire to secure by Letters Patent is:—

1. An apparatus for making artificial ice, comprising a jacketed can adapted to contain the water to be frozen, means for causing a freezing medium to circulate between the jacket and the can, means for admitting air through the bottom of said can, and a valved outlet communicating with the bottom of the can for discharging therefrom into the open air the unfrozen water remaining therein after the mass of ice has been formed.

2. An apparatus for making artificial ice, comprising a jacketed can adapted to contain the water to be frozen, means for causing a freezing medium to circulate between the jacket and the can, an external air-pipe opening into said can through the bottom thereof for admitting air thereto, and a drain-pipe communicating with the bottom of the said can for drawing off the unfrozen water therefrom.

3. An apparatus for making artificial ice, comprising a jacketed can having a brine-chamber surrounding the sides of said can, an air-pipe outside of the brine chamber and can, and opening into said can at the bottom thereof, and a drain-pipe communicating with the bottom of the can for discharging the unfrozen water therefrom.

4. An apparatus for making artificial ice, comprising a can, a sleeve fitted in the bottom of the can and opening thereinto, an air-pipe extending into said sleeve and adapted to discharge air into said can at the bottom thereof, and a drain-pipe communicating with said sleeve.

5. An apparatus for making artificial ice, comprising a can, a sleeve fitted in the bottom of the can and opening thereinto, said sleeve being insulated therefrom, an air-pipe extending into said sleeve and adapted to discharge air into said can at the bottom thereof, and a drain-pipe communicating with said sleeve.

OMAR H. JEWELL.

Witnesses:
JOHN L. JACKSON,
W. H. DE BUSK.